(12) United States Patent
Kinjo

(10) Patent No.: US 12,135,252 B2
(45) Date of Patent: Nov. 5, 2024

(54) FORCE SENSOR WITH CONDUCTIVE FILMS

(71) Applicant: Japan Display Inc., Tokyo (JP)

(72) Inventor: Hiroumi Kinjo, Tokyo (JP)

(73) Assignee: Japan Display Inc., Tokyo (JP)

(*) Notice: Subject to any disclaimer, the term of this patent is extended or adjusted under 35 U.S.C. 154(b) by 301 days.

(21) Appl. No.: 17/686,910

(22) Filed: Mar. 4, 2022

(65) Prior Publication Data

US 2022/0187145 A1 Jun. 16, 2022

Related U.S. Application Data

(63) Continuation of application No. PCT/JP2020/029521, filed on Jul. 31, 2020.

(30) Foreign Application Priority Data

Sep. 20, 2019 (JP) .................................. 2019-172075

(51) Int. Cl.
*G01L 1/20* (2006.01)
*G01L 1/14* (2006.01)
*G01L 1/16* (2006.01)

(52) U.S. Cl.
CPC .............. *G01L 1/205* (2013.01); *G01L 1/146* (2013.01); *G01L 1/16* (2013.01)

(58) Field of Classification Search
CPC ............ G01L 1/16; G01L 1/205; G01L 1/146
See application file for complete search history.

(56) References Cited

U.S. PATENT DOCUMENTS

| 4,555,953 | A | * | 12/1985 | Dario | G01L 5/228 |
| | | | | | 901/33 |
| 6,769,313 | B2 | | 8/2004 | Weiss | |
| 6,964,201 | B2 | * | 11/2005 | Xu | H10N 30/074 |
| | | | | | 257/E27.006 |
| 7,242,065 | B2 | * | 7/2007 | Kondo | G01L 9/0054 |
| | | | | | 73/754 |
| 9,597,933 | B2 | * | 3/2017 | Yamaguchi | H01L 21/02189 |
| 9,671,297 | B2 | * | 6/2017 | Sibbett | G06F 3/045 |
| 9,904,393 | B2 | * | 2/2018 | Frey | G06F 3/04144 |

(Continued)

FOREIGN PATENT DOCUMENTS

JP H06-281516 A 10/1994

OTHER PUBLICATIONS

Office Action issued in related Japanese Patent Application No. 2019-172075, mailed on Sep. 6, 2022 and English translation of same. 5 pages.

(Continued)

*Primary Examiner* — Tran M. Tran
(74) *Attorney, Agent, or Firm* — K&L Gates LLP

(57) ABSTRACT

A force sensor includes: a sensor sheet having a first surface and a second surface on an opposite side to the first surface; a substrate facing the first surface; a first adhesive layer interposed between the substrate and the sensor sheet and made of an anisotropic conductive material; and a plurality of array electrodes interposed between the substrate and the first adhesive layer and separated from each other. The first surface of the sensor sheet is bonded to the first adhesive layer. The first adhesive layer has conductivity in a thickness direction and has insulation properties in a planar direction along a plane.

5 Claims, 8 Drawing Sheets

(56) References Cited

U.S. PATENT DOCUMENTS

| | | | | |
|---|---|---|---|---|
| 10,267,690 | B2* | 4/2019 | Wu | G01L 5/165 |
| 10,545,059 | B2* | 1/2020 | Tian | H10N 30/084 |
| 10,613,668 | B2* | 4/2020 | Frey | H01H 65/00 |
| 10,919,158 | B2* | 2/2021 | Hart | G01L 5/228 |
| 10,949,002 | B2* | 3/2021 | Lee | G06F 3/04164 |
| 11,054,932 | B2* | 7/2021 | Xu | G06F 3/0416 |
| 11,093,088 | B2* | 8/2021 | Bagheri | G06F 3/0445 |
| 11,460,946 | B2* | 10/2022 | Xu | G06F 3/0416 |
| 11,556,202 | B2* | 1/2023 | Nathan | G06F 3/0414 |
| 11,740,747 | B2* | 8/2023 | Kurasawa | G06F 3/0446 |
| | | | | 345/173 |
| 11,828,964 | B2* | 11/2023 | Takahashi | G02B 5/3016 |
| 2007/0242054 | A1* | 10/2007 | Chang | G06F 3/0446 |
| | | | | 345/173 |
| 2013/0020557 | A1* | 1/2013 | Roscheisen | H10K 30/151 |
| | | | | 977/762 |
| 2015/0292963 | A1* | 10/2015 | Kawamura | G09G 3/36 |
| | | | | 345/87 |
| 2016/0288474 | A1* | 10/2016 | Tseng | G01N 19/04 |
| 2017/0160147 | A1* | 6/2017 | Genmei | G01B 7/22 |
| 2017/0185187 | A1* | 6/2017 | Nakayama | G06F 3/0445 |
| 2018/0101269 | A1* | 4/2018 | Lee | G06F 3/0445 |
| 2020/0064971 | A1* | 2/2020 | Suto | G06F 3/0443 |
| 2021/0408364 | A1* | 12/2021 | Stadlober | H10N 30/084 |
| 2022/0252471 | A1* | 8/2022 | Liimatta | G06F 3/041662 |
| 2022/0390301 | A1* | 12/2022 | Sato | H05K 1/189 |

OTHER PUBLICATIONS

Search Report issued in International Patent Application No. PCT/JP2020/029521 on Sep. 1, 2020 and English translation of same. 5 pages.

Written Opinion issued in International Patent Application No. PCT/JP2020/029521 on Sep. 1, 2020. 4 pages.

* cited by examiner

FORCE SENSOR WITH CONDUCTIVE FILMS

CROSS-REFERENCE TO RELATED APPLICATION

This application claims the benefit of priority from Japanese Patent Application No. 2019-172075 filed on Sep. 20, 2019 and International Patent Application No. PCT/JP2020/029521 filed on Jul. 31, 2020, the entire contents of which are incorporated herein by reference.

BACKGROUND

1. Technical Field

What is disclosed herein relates to a force sensor.

2. Description of the Related Art

A force sensor includes a sensor layer stacked on a substrate on which array electrodes are provided (see Japanese Patent Application Laid-open Publication No. H6-281516). In such a force sensor, the sensor layer is patterned directly on the substrate in some cases, and a sensor sheet (sensor layer) that has been separately manufactured is stuck onto the substrate in other cases. Conventionally, when a sheet-like object such as the sensor sheet is stuck, not the entire sheet but only edge portions of the sheet are bonded. In other words, a bonded portion at which the sensor sheet and the substrate are bonded to each other has what is called a frame shape.

When the sensor sheet is bonded only at the edge portions, wrinkles may be generated in a center portion of the sensor sheet. A counter electrode can be provided on the sensor sheet. Generation of the wrinkles in the sensor sheet thereby causes the counter electrode to deviate with respect to the array electrodes and a force-applied place (coordinates) cannot be accurately grasped. When the sensor sheet is bonded only at the edge portions, foreign matters possibly enter between the sensor sheet and the substrate. Furthermore, when only the edge portions of the sensor sheet are bonded, stress is concentrated on the edge portions and the sensor sheet may be peeled off from the substrate. On the other hand, when the entire sensor sheet is bonded, the counter electrode and the array electrodes that do not originally face this counter electrode possibly conduct with each other through an adhesive layer. This means that crosstalk may occur.

For the foregoing reasons, there is a need for a force sensor that can avoid crosstalk and in which an entire sensor sheet is bonded.

SUMMARY

According to an aspect, a force sensor includes: a sensor sheet having a first surface and a second surface on an opposite side to the first surface; a substrate facing the first surface; a first adhesive layer interposed between the substrate and the sensor sheet and made of an anisotropic conductive material; and a plurality of array electrodes interposed between the substrate and the first adhesive layer and separated from each other. The first surface of the sensor sheet is bonded to the first adhesive layer. The first adhesive layer has conductivity in a thickness direction and has insulation properties in a planar direction along a plane.

DETAILED DESCRIPTION

Figure 1:
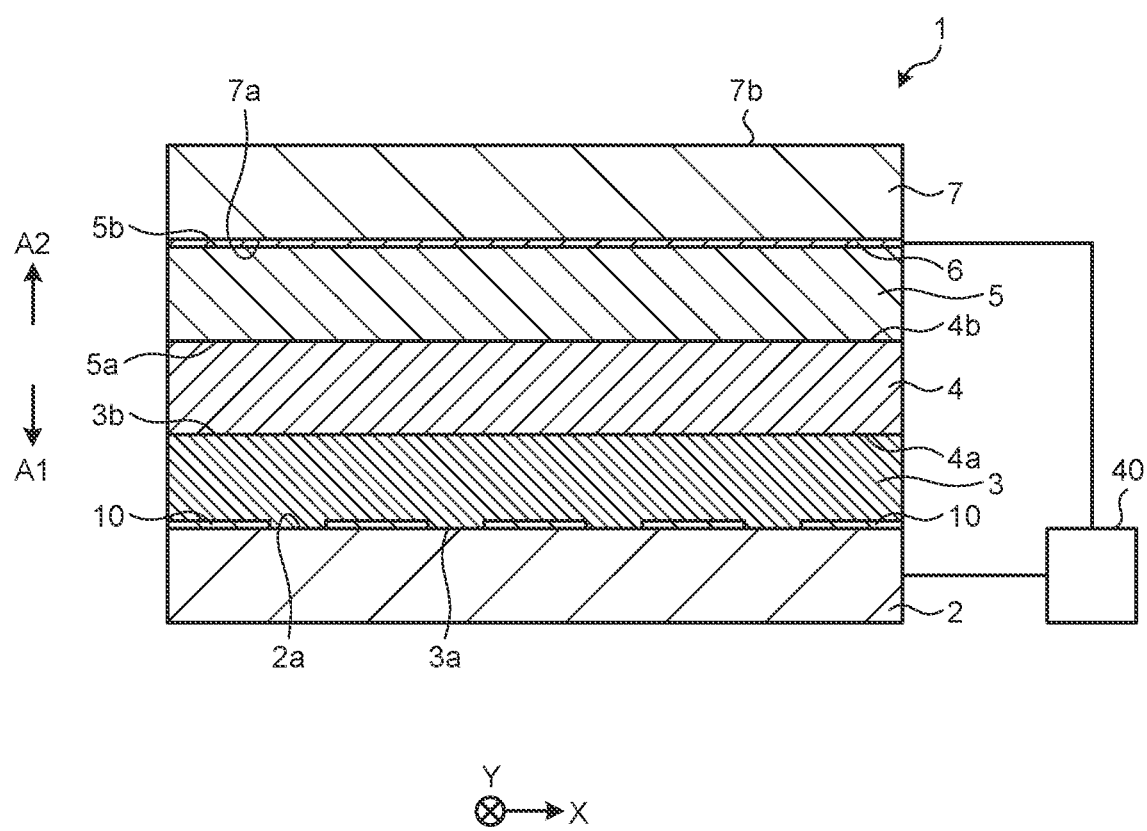
FIG. 1 is a cross-sectional view illustrating a cross-sectional structure of a force sensor according to a first embodiment.

Modes (embodiments) for carrying out a force sensor of the present disclosure will be described in detail with reference to the drawings. Contents described in the following embodiments do not limit the inventions of the present disclosure. Components described below include those that can be easily assumed by those skilled in the art and those that are substantially the same. Furthermore, the components described below can be combined as appropriate. What is disclosed herein is merely an example, and it is needless to say that appropriate modifications within the gist of the disclosure at which those skilled in the art can easily arrive are encompassed in the range of the present invention. In the drawings, widths, thicknesses, shapes, and the like of the components can be schematically illustrated in comparison with actual modes for more clear explanation. They are however merely examples and do not limit interpretation of the present invention. In the present specification and the drawings, the same reference numerals denote components similar to those described before with reference to the drawing that has been already referred, and detail explanation thereof can be appropriately omitted.

First Embodiment

Figure 2:
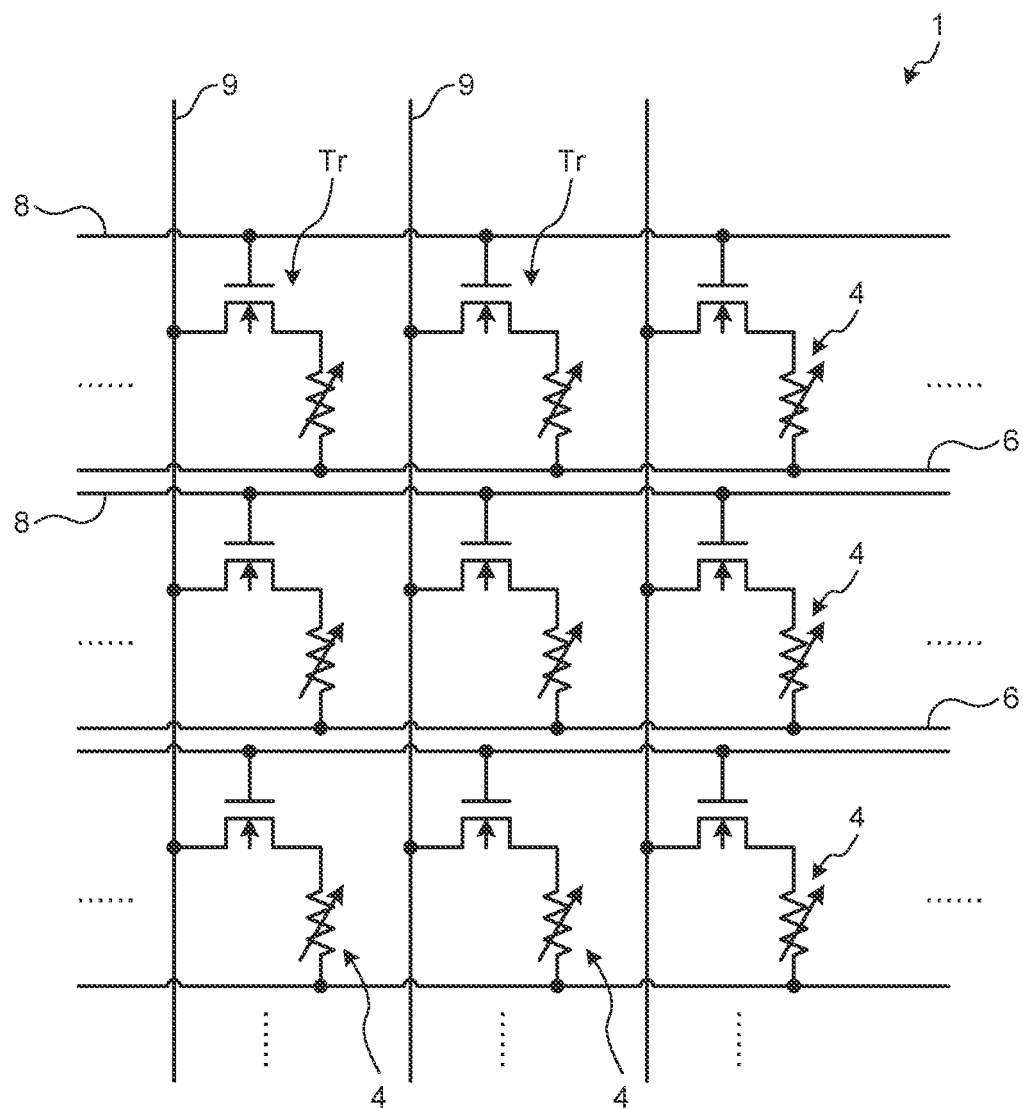
FIG. 2 is a circuit diagram for explaining a circuit configuration formed on a substrate in the first embodiment.
Figure 3:
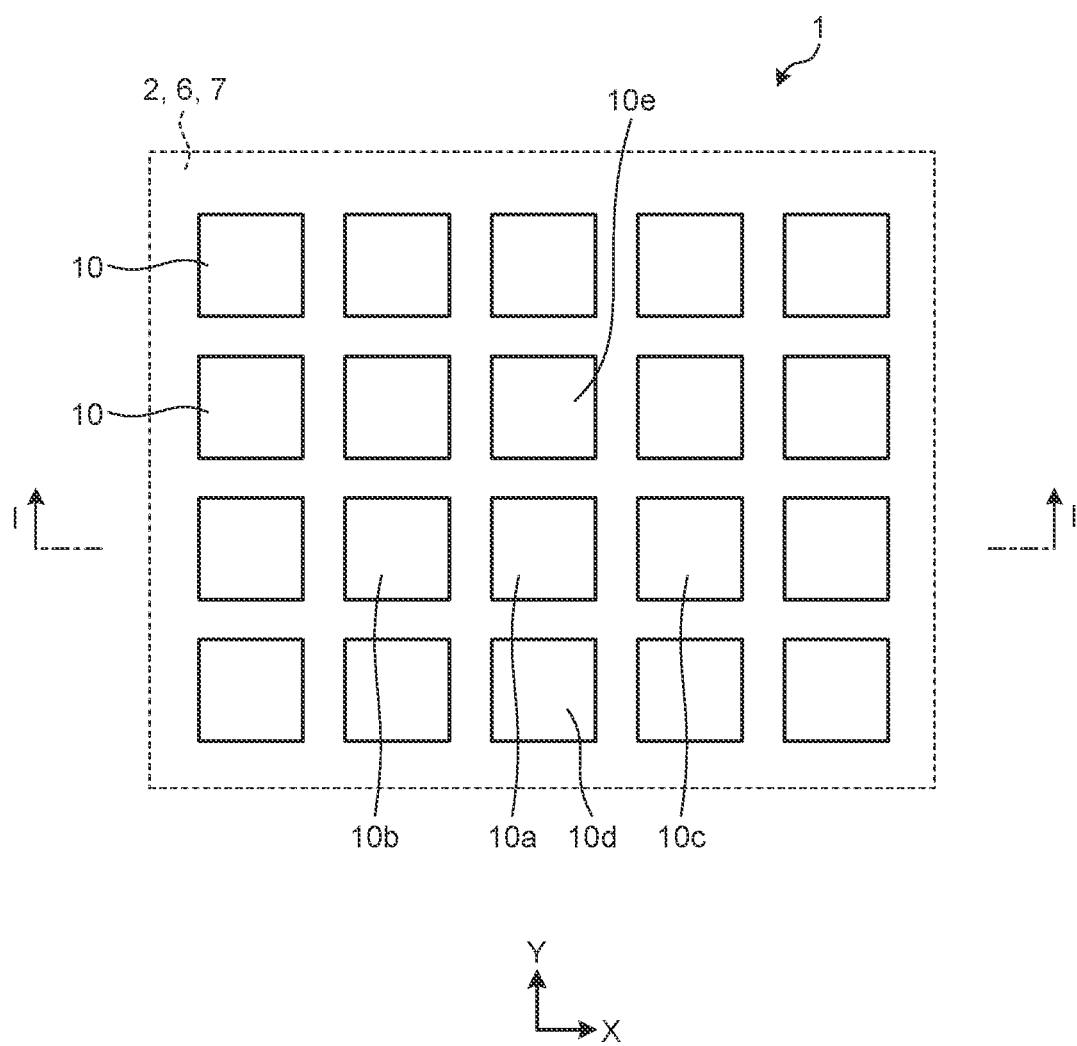
FIG. 3 is a plan view for explaining array electrodes in the first embodiment.
Figure 4:
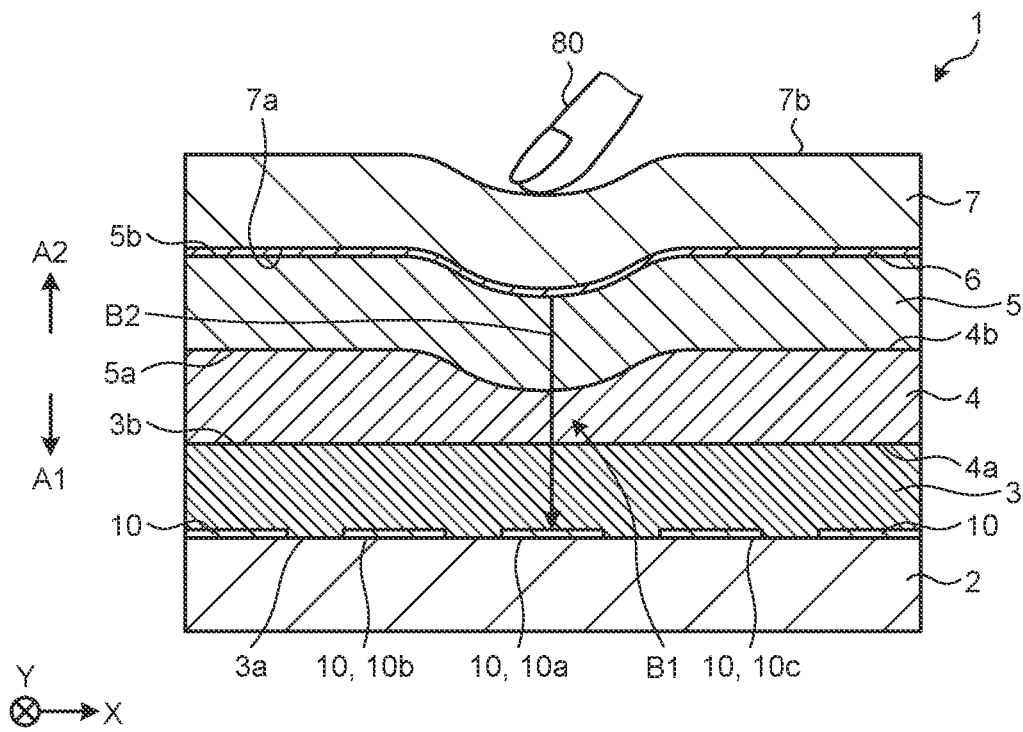
FIG. 4 is a cross-sectional view illustrating a usage state of the force sensor in the first embodiment.

FIG. 1 is a cross-sectional view illustrating a cross-sectional structure of a force sensor according to a first embodiment. FIG. 2 is a circuit diagram for explaining a circuit configuration formed on a substrate in the first embodiment. FIG. 3 is a plan view for explaining array electrodes in the first embodiment. FIG. 4 is a cross-sectional view illustrating a usage state of the force sensor in the first embodiment. A force sensor 1 in the first embodiment includes a substrate 2, a first adhesive layer 3, a sensor layer 4, a second adhesive layer 5, a counter electrode 6, and a protective layer 7. In order to measure force applied to the force sensor 1, a controller 40 is coupled to the substrate 2 and the counter electrode 6. For convenience of explanation, a direction in which the substrate 2, the first adhesive layer 3, the sensor layer 4, the second adhesive layer 5, the counter electrode 6, and the protective layer 7 are stacked, is referred to as a stacking direction. A direction in which the substrate 2 is arranged when viewed from the sensor layer 4, is referred to as a first direction A1; and a direction in which the protective layer 7 is arranged when viewed from the sensor layer 4, is referred to as a second direction A2.

The substrate 2 is an insulating substrate. The substrate 2 has a facing surface 2a that faces the sensor layer 4. A plurality of array electrodes 10 are provided on the facing surface 2a. As illustrated in FIG. 2, the substrate 2 includes a plurality of transistors Tr, scan lines 8 coupled to gate electrodes of the transistors Tr, and signal lines 9 coupled to source electrodes of the transistors Tr. Each array electrode 10 is coupled to a drain electrode of the transistor Tr. As illustrated in FIG. 3, the substrate 2 has a rectangular shape when viewed in the stacking direction. The substrate 2 thereby has a pair of long sides extending in the X direction and a pair of short sides extending in the Y direction. The array electrodes 10 are arranged in a matrix with a row-column configuration on the substrate 2.

As illustrated in FIG. 1, the first adhesive layer 3 is a sheet member formed into the same shape as that of the substrate 2 when viewed in the stacking direction. The first adhesive layer 3 has a first surface 3a provided in the first direction A1 and a second surface 3b provided in the second direction A2. The first adhesive layer 3 is formed of insulating resin or rubber as a base material, and conductive fine particles are dispersed inside the base material. The conductive fine particles are arranged inside the base material so as to be in contact with each other in a thickness direction in the first adhesive layer 3. The first adhesive layer 3 therefore has a plurality of paths through which electricity flows substantially linearly in the thickness direction. As is seen from the above, the first adhesive layer 3 is made of an anisotropic conductive material that has conductivity in the thickness direction (stacking direction) and has insulation properties in a planar direction. The first surface 3a and the second surface 3b of the first adhesive layer 3 are coated with an adhesive (not illustrated). In other words, the first adhesive layer 3 is a double-sided adhesive tape. The entire first surface 3a of the first adhesive layer 3 is bonded to the substrate 2. On the other hand, the entire second surface 3b of the first adhesive layer 3 is bonded to an entire first surface (facing surface) 4a of the sensor layer 4. The double-sided adhesive tape is used as the first adhesive layer 3 in the first embodiment as an example, but the first adhesive layer 3 may be formed by curing molten resin. In this case, examples of the resin include photocurable resin and thermosetting resin in which conductive fine particles are dispersed.

The sensor layer 4 is a sheet member formed into the same shape as that of the substrate 2 when viewed in the stacking direction. A sensor sheet that is manufactured separately from the substrate 2 is used as the sensor layer 4. The sensor sheet is bonded to the second surface 3b of the first adhesive layer 3 to be integrated with the substrate 2. The sensor layer 4 is made of, as a raw material, a pressure-sensitive conductive elastomer formed by dispersing conductive fine particles in a highly insulating rubber material. The conductive fine particles arranged inside a base material are separated from each other in the sensor layer 4. Rubber having low rigidity is selected as the base material of the sensor layer 4. The sensor layer 4 under normal conditions (when it is not deformed) therefore exhibits an extremely large resistance value and has insulation properties both in the thickness direction and in the planar direction. On the other hand, when force is applied to the sensor layer 4 by a finger 80, the base material at the force-applied place is depressed in the first direction A1 (see FIG. 4). This brings the conductive fine particles contained in the deformed base material into contact with each other, and they become conductive in the thickness direction. As is seen from the above, the sensor layer 4 in the first embodiment is made of the pressure-sensitive material whose resistance value changes with force applied in the thickness direction.

Insulating resin or rubber that has higher rigidity than that of the base material of the sensor layer 4 is selected as the base material of the first adhesive layer 3. That is to say, the sensor layer 4 is deformed and the first adhesive layer is not deformed when force is applied by the finger 80. If the sensor layer 4 has higher rigidity than that of the first adhesive layer 3, the first adhesive layer 3 may be depressed in the first direction A1 and the thickness of the sensor layer 4 may not be decreased by force application to the protective layer 7. In other words, the resistance value of the sensor layer 4 may not be decreased enough to detect the force. For the above-mentioned reason, the insulating resin or rubber that has higher rigidity than that of the base material of the sensor layer 4 is selected as the base material of the first adhesive layer 3.

The second adhesive layer 5 is a sheet member formed into the same shape as that of the substrate 2 when viewed in the stacking direction. The second adhesive layer 5 has a first surface 5a in the first direction A1 and a second surface 5b in the second direction A2. The second adhesive layer 5 is made of, as a raw material, resin having conductivity. Resin having low rigidity is selected as the second adhesive layer 5. Accordingly, when the force is applied by the finger 80, a base material at the force-applied place is depressed in the first direction A1, and the sensor layer 4 is correspondingly depressed (see FIG. 4). The second adhesive layer 5 is a double-sided adhesive tape, and the first surface 5a and the second surface 5b are coated with an adhesive (not illustrated). The entire first surface 5a of the second adhesive layer 5 is bonded to the entire second surface 4b of the sensor layer 4.

The counter electrode 6 is an electrode patterned on a first surface 7a of the protective layer 7. The counter electrode 6 is formed into a rectangular shape that is the same as that of the substrate 2 when viewed in the stacking direction and is formed to have the same size as that of the substrate 2. That is to say, the counter electrode 6 is a solid electrode formed in a form of a film on the entire surface of the protective layer 7. The controller 40 applies a reference voltage to the counter electrode 6.

The protective layer 7 is a sheet member formed into the same shape as that of the substrate 2 when viewed in the stacking direction. The protective layer 7 is made of rubber or resin having high insulation properties and low rigidity. The protective layer 7 is manufactured separately from the sensor layer (sensor sheet) 4. The counter electrode 6 is formed in the form of a film on the first surface 7a of the protective layer 7 before the protective layer 7 is bonded to the second adhesive layer 5. The entire first surface 7a of the protective layer 7 is bonded to the second surface 5b of the second adhesive layer 5. Force is applied to a second surface 7b of the protective layer 7 by the finger 80, a pen, or the like. The counter electrode 6 and the protective layer 7 have the same degree of rigidity as those of the sensor layer 4 and the second adhesive layer 5, so that only parts to which the force is applied by the finger 80 are depressed.

The controller 40 includes a gate driver (not illustrated) coupled to the scan lines 8 and a source driver (not illustrated) coupled to the signal lines 9 in order to sequentially select the array electrodes 10. The controller 40 also measures current values flowing through the array electrodes 10. The place (coordinates) of the sensor layer 4 that is deformed by the force and the force are thereby measured.

The following explains an example of operations of the force sensor 1 with reference to FIG. 4. When no force is applied to the second surface 7b of the protective layer 7, the thickness of the sensor layer 4 is not decreased. Therefore, the sensor layer 4 has insulation properties in the thickness direction, and no current (signal) flows from the counter electrode 6 to the sensor layer 4. When force is applied by the finger 80 to the second surface 7b of the protective layer 7 in the first direction A1, the sensor layer 4, the second adhesive layer 5, the counter electrode 6, and the protective layer 7 that have lower rigidity than that of the first adhesive layer 3 are depressed in the first direction A1. A deformed portion B1 (see a place pointed by an arrow in FIG. 4) depressed in the first direction A1 in the sensor layer 4 is therefore decreased in a resistance value. Current thereby flows from the counter electrode 6 to the deformed portion B1 of the sensor layer 4.

An array electrode 10a among the array electrodes 10 overlaps with the deformed portion B1 of the sensor layer 4 when viewed in the stacking direction. As illustrated in FIG. 3, array electrodes 10b and 10c adjacent to the array electrode 10a in the X direction and array electrodes 10d and 10e adjacent to the array electrode 10a in the Y direction are arranged around the array electrode 10a. The first adhesive layer 3 has conductivity in the thickness direction (stacking direction) and insulation properties in the planar direction. The deformed portion B1 of the sensor layer 4 is therefore electrically coupled to only the array electrode 10a through the first adhesive layer 3. In other words, the deformed portion B1 of the sensor layer 4 is not electrically coupled to each of the array electrodes 10b, 10c, 10d, and 10e.

As is seen from the above, current flows from the deformed portion B1 of the sensor layer 4 to the array electrode 10a (see an arrow B2 in FIG. 4), and no current flows to the other array electrodes 10b, 10c, 10d, and 10e. As a result, the controller 40 can detect input of a signal (current) to the array electrode 10a and calculate the force-applied place (coordinates) and a force value.

As described above, with the force sensor 1 in the first embodiment, the entire first surface 4a of the sensor layer (sensor sheet) 4 is fixed to the substrate 2 with the first adhesive layer 3 interposed therebetween. Therefore, wrinkles are less possibly generated in the sensor layer (sensor sheet) 4. In addition, since the first adhesive layer 3 is made of, as the raw material, the anisotropic conductive material, crosstalk is unlikely to occur inside the first adhesive layer 3.

In the first embodiment, the entire second surface 4b of the sensor layer (sensor sheet) 4 is fixed to the protective layer 7 with the second adhesive layer 5 interposed therebetween. Therefore, wrinkles are much less possibly generated in the sensor layer (sensor sheet) 4.

Next, other embodiments will be explained. The other embodiments have the same configuration as that of the first embodiment except for specially mentioned matters.

Second Embodiment

Figure 5:
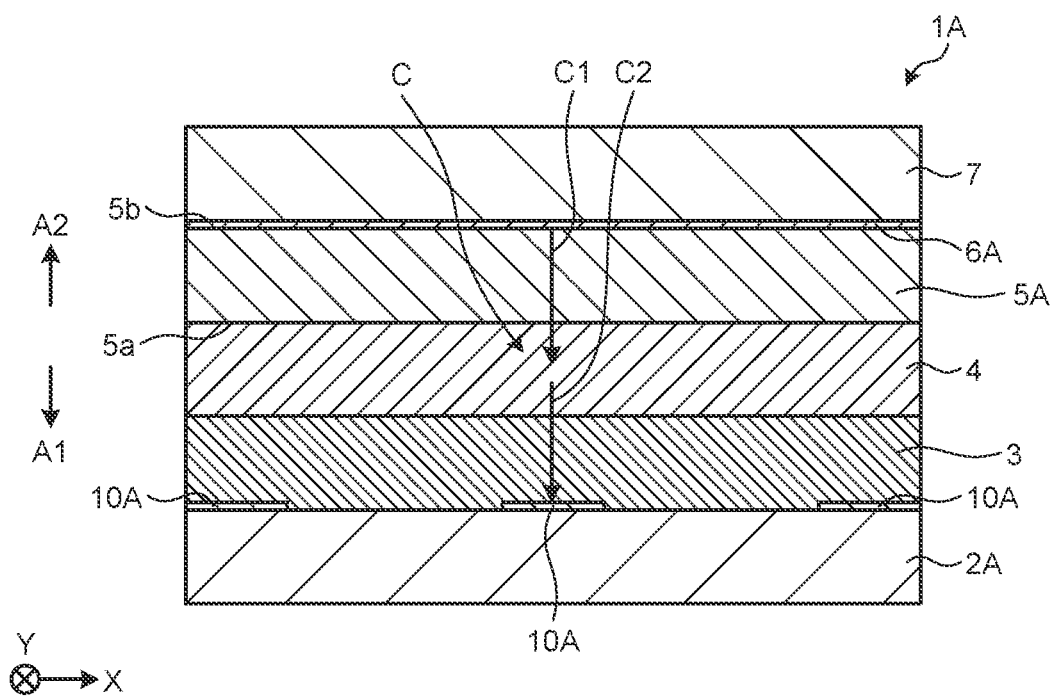
FIG. 5 is a cross-sectional view illustrating a cross-sectional structure when a force sensor according to a second embodiment is cut along a plane including an X direction and a stacking direction.
Figure 6:
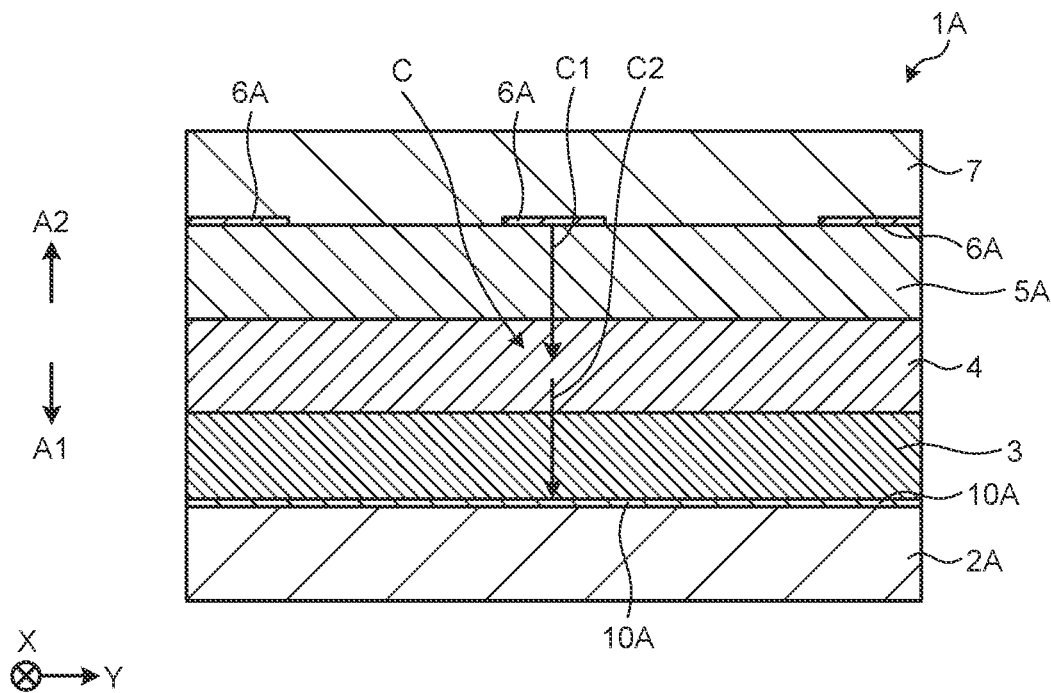
FIG. 6 is a cross-sectional view illustrating a cross-sectional structure when the force sensor in the second embodiment is cut along a plane including a Y direction and the stacking direction.
Figure 7:
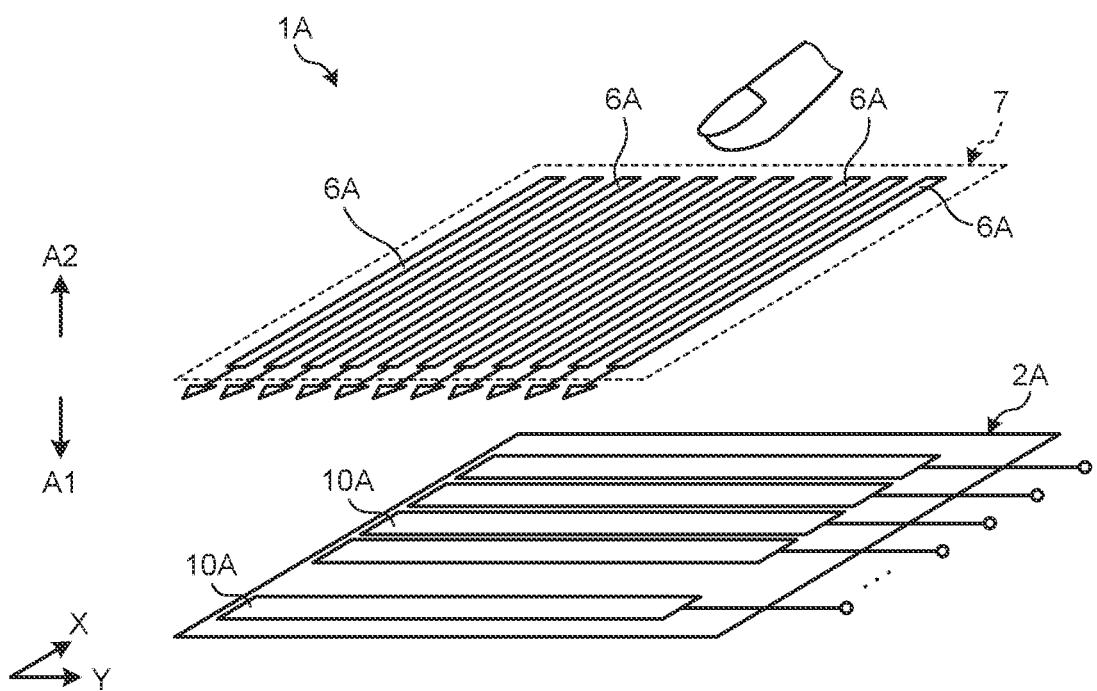
FIG. 7 is a perspective view for explaining a relation between array electrodes and counter electrodes in the second embodiment.

FIG. 5 is a cross-sectional view illustrating a cross-sectional structure when a force sensor according to a second embodiment is cut along a plane including the X direction and the stacking direction. FIG. 6 is a cross-sectional view illustrating a cross-sectional structure when the force sensor in the second embodiment is cut along a plane including the Y direction and the stacking direction. FIG. 7 is a perspective view for explaining a relation between array electrodes and counter electrodes in the second embodiment. As illustrated in FIGS. 5 and 6, a force sensor 1A in the second embodiment differs from the force sensor 1 in the first embodiment in that it includes a substrate 2A, a second adhesive layer 5A, and counter electrodes 6A instead of the substrate 2, the second adhesive layer 5, and the counter electrode 6.

The substrate 2A is not provided with the transistors Tr, the scan lines 8, and the signal lines 9. As illustrated in FIG. 7, array electrodes 10A provided on the substrate 2A are formed into strip shapes and extend in the Y direction. The array electrodes 10A are arranged in the X direction while being separated from each other. On the other hand, the counter electrodes 6A are formed into strip shapes and extend in the X direction. The counter electrodes 6A and the array electrodes 10A therefore intersect with each other when viewed in the stacking direction. The counter electrodes 6A are arranged in the Y direction while being separated from each other.

As illustrated in FIG. 5, the second adhesive layer 5A is formed into a sheet-like shape. The second adhesive layer 5A has a first surface 5a in the first direction A1 and a second surface 5b in the second direction A2. The second adhesive layer 5A is formed of insulating resin or rubber as a base material, and conductive fine particles are dispersed inside the base material. The second adhesive layer 5A is made of an anisotropic conductive material as a raw material. The conductive fine particles of the second adhesive layer 5A are arranged inside the base material so as to be in contact with each other in the thickness direction. The second adhesive layer 5A therefore has a plurality of paths through which electricity flows substantially linearly in the thickness direction. As is seen from the above, the second adhesive layer 5A has conductivity in the thickness direction (stacking direction) and insulation properties in the planar direction.

The insulating resin or rubber having low rigidity is selected as the base material of the second adhesive layer 5A. Accordingly, when force is applied by the finger 80, the base material at the force-applied place is depressed in the first direction A1, and the sensor layer 4 is correspondingly depressed. The second adhesive layer 5A has lower rigidity than that of the first adhesive layer 3 although both of them are the adhesive layers. Examples of a method of thus making the rigidities of the two adhesive layers different include a method in which resin or rubber forming the base material is made different therebetween. In general, epoxy resin and acrylic resin are exemplified as resin having high rigidity while siloxane-modified epoxy resin and silicone resin are exemplified as resin having low rigidity. Accordingly, the epoxy resin or acrylic resin may be used as the base material of the first adhesive layer 3, and the siloxane-modified epoxy resin or silicone resin may be used as the base material of the second adhesive layer 5. The above-mentioned materials are merely examples, and the first adhesive layer 3 and the second adhesive layer 5A are not limited to be made of them.

The controller 40 in the second embodiment sequentially selects the counter electrodes 6A and applies a reference voltage to the counter electrodes 6A. When a resistance value of a part (a place pointed by an arrow C in FIG. 6) of the sensor layer 4 is decreased due to force application, current flows between the array electrode 10A and the counter electrode 6A that interpose the part of the sensor layer 4 from the stacking direction (see arrows C1 and C2 in FIGS. 5 and 6), and the force-applied place (coordinates) can be determined.

In the second embodiment, the second adhesive layer 5A has insulation properties in the planar direction. Therefore, even if the reference voltage is applied to the counter electrodes 6A that do not overlap, when viewed in the stacking direction, with the deformed part (place pointed to by the arrow C in FIG. 6) of the sensor layer 4 depressed by the force application, no current flows from the counter electrodes 6A to the deformed part (place pointed to by the arrow C in FIG. 6) of the sensor layer 4. In other words, only when the reference voltage is applied to the counter electrode 6A that overlaps, when viewed in the stacking direction, with the deformed part (place pointed to by the arrow C in FIG. 6) of the sensor layer 4 depressed by the force application, current flows from the counter electrode 6A to the deformed part (place pointed to by the arrow C in FIG. 6) of the sensor layer 4 (see the arrow C1 in FIG. 6).

As described above, according to the second embodiment, crosstalk is unlikely to occur inside the first adhesive layer 3 and the second adhesive layer 5A.

Third Embodiment

Figure 8:
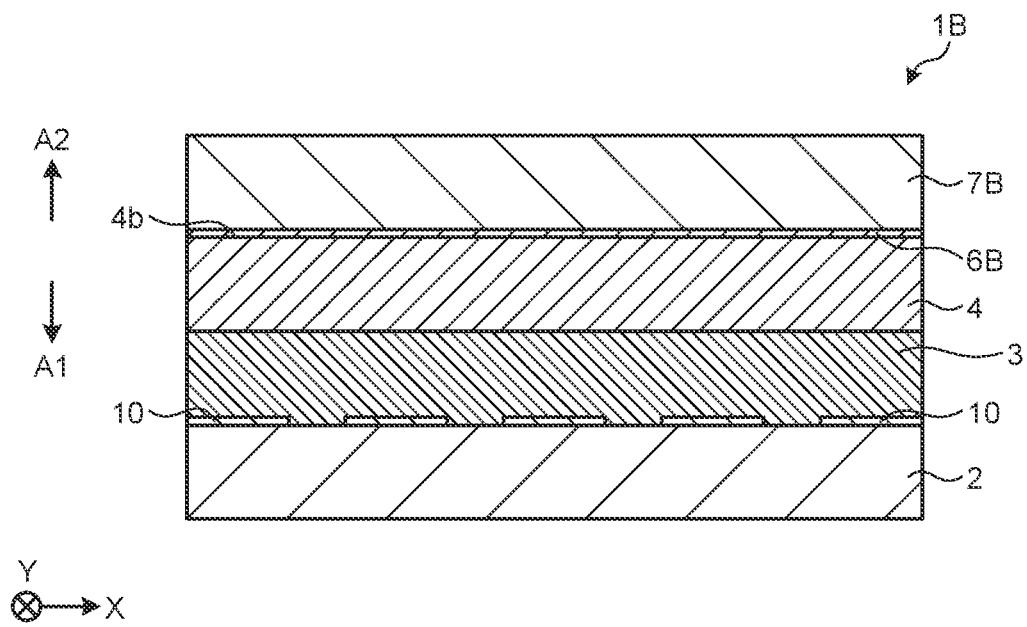
FIG. 8 is a cross-sectional view illustrating a cross-sectional structure of a force sensor according to a third embodiment.

FIG. 8 is a cross-sectional view illustrating a cross-sectional structure of a force sensor according to a third embodiment. As illustrated in FIG. 8, a force sensor 1B in the third embodiment differs from the force sensor 1 in the first embodiment in that it includes no second adhesive layer 5. The counter electrode 6B is therefore in contact with the second surface 4b of the sensor layer 4. In a manufacturing method of the force sensor 1B, a counter electrode 6B and a protective layer 7B are patterned on the second surface 4b of the sensor layer 4 before the sensor sheet (sensor layer) is bonded to the first adhesive layer 3. The sensor sheet is then bonded to the first adhesive layer 3, thereby manufacturing the force sensor 1B.

Even with this configuration, the entire first surface 4a of the sensor layer (sensor sheet) 4 is bonded to the first adhesive layer 3, so that wrinkles are less possibly generated in the sensor layer (sensor sheet) 4. In addition, since the first adhesive layer 3 is made of the anisotropic conductive material, crosstalk is unlikely to occur inside the first adhesive layer 3.

Fourth Embodiment

Figure 9:
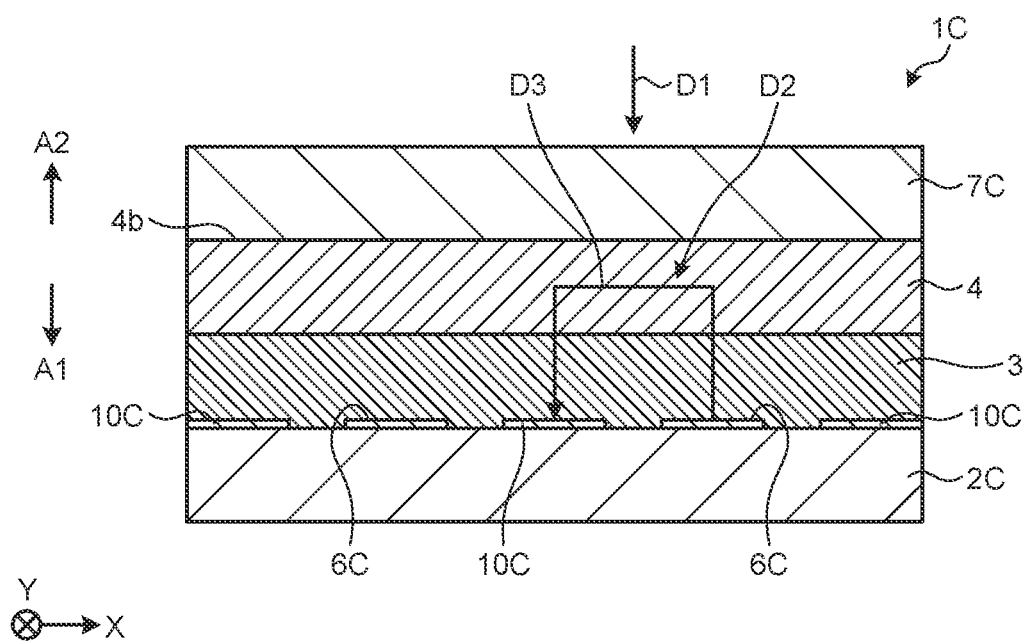
FIG. 9 is a cross-sectional view illustrating a cross-sectional structure of a force sensor according to a fourth embodiment.
Figure 10:
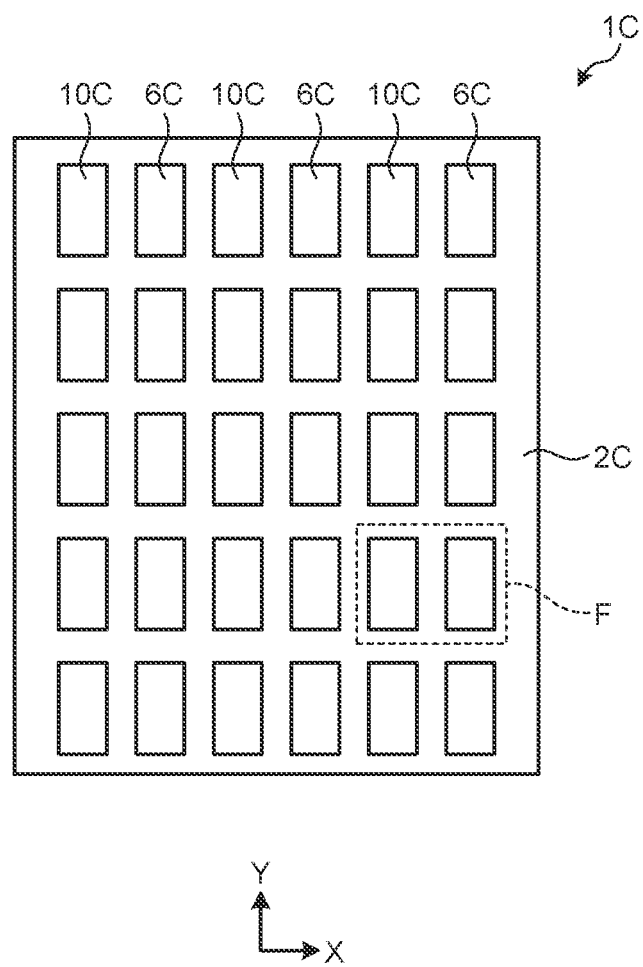
FIG. 10 is a plan view illustrating a positional relation between electrodes and counter electrodes in the force sensor in the fourth embodiment.

FIG. 9 is a cross-sectional view illustrating a cross-sectional structure of a force sensor according to a fourth embodiment. FIG. 10 is a plan view when a substrate in the fourth embodiment is seen from above. As illustrated in FIG. 9, a force sensor 1C in the fourth embodiment differs from the force sensor 1 in the first embodiment in that it includes no second adhesive layer 5. The force sensor 1C in the fourth embodiment further differs from the force sensor 1 in the first embodiment in that counter electrodes 6C are provided on the substrate 2C.

A protective layer 7C is patterned on the second surface 4b of the sensor layer 4 before the sensor sheet is bonded to the first adhesive layer 3. The sensor sheet is then bonded to the first adhesive layer 3, so that the protective layer 7C is integrated with the substrate 2C.

As illustrated in FIG. 10, the counter electrodes 6C and a plurality of array electrodes 10C are provided on a substrate 2C. The counter electrodes 6C are arranged at positions that do not overlap with the array electrodes 10C. More in detail, the counter electrodes 6C and the array electrodes 10C are arranged alternately in the X direction on the substrate 2. The counter electrodes 6C are arranged with equal intervals in the Y direction of the counter electrodes 6C. The array electrodes 10C are arranged with equal intervals in the Y direction of the array electrodes 10C.

With this configuration, as illustrated in FIG. 9 (see an arrow D1), when force is applied to the protective layer 7C such that a part between the counter electrode 6C and the array electrode 10C is depressed when viewed in the stacking direction, a part of the sensor layer 4 (place pointed by an arrow D2 in FIG. 9) is depressed in the first direction A1, and the resistivity of the part of the sensor layer 4 (place pointed by the arrow D2 in FIG. 9) is decreased. As a result, a signal (current) output from the counter electrode 6C flows through the first adhesive layer 3 in the second direction A2 as indicated by an arrow D3 and flows to the part of the sensor layer 4 (place pointed by the arrow D2 in FIG. 9). Then, the signal flows in the planar direction through the part of the sensor layer 4 (part pointed by the arrow D2 in FIG. 9). Thereafter, the current flows through the first adhesive layer 3 in the first direction A1 to the array electrode 10C. That is to say, in the fourth embodiment, a set of the counter electrode 6C and the array electrode 10C adjacent to each other in the X direction (see a range enclosed by dashed line F in FIG. 10) is electrodes for detecting that force is applied.

As described above, according to the fourth embodiment, the entire first surface 4a of the sensor layer 4 is bonded to the first adhesive layer 3, so that wrinkles are less possibly generated in the sensor layer 4. In addition, since the first adhesive layer 3 is made of the anisotropic conductive material, crosstalk also less possibly occurs therein.

Fifth Embodiment

Figure 11:
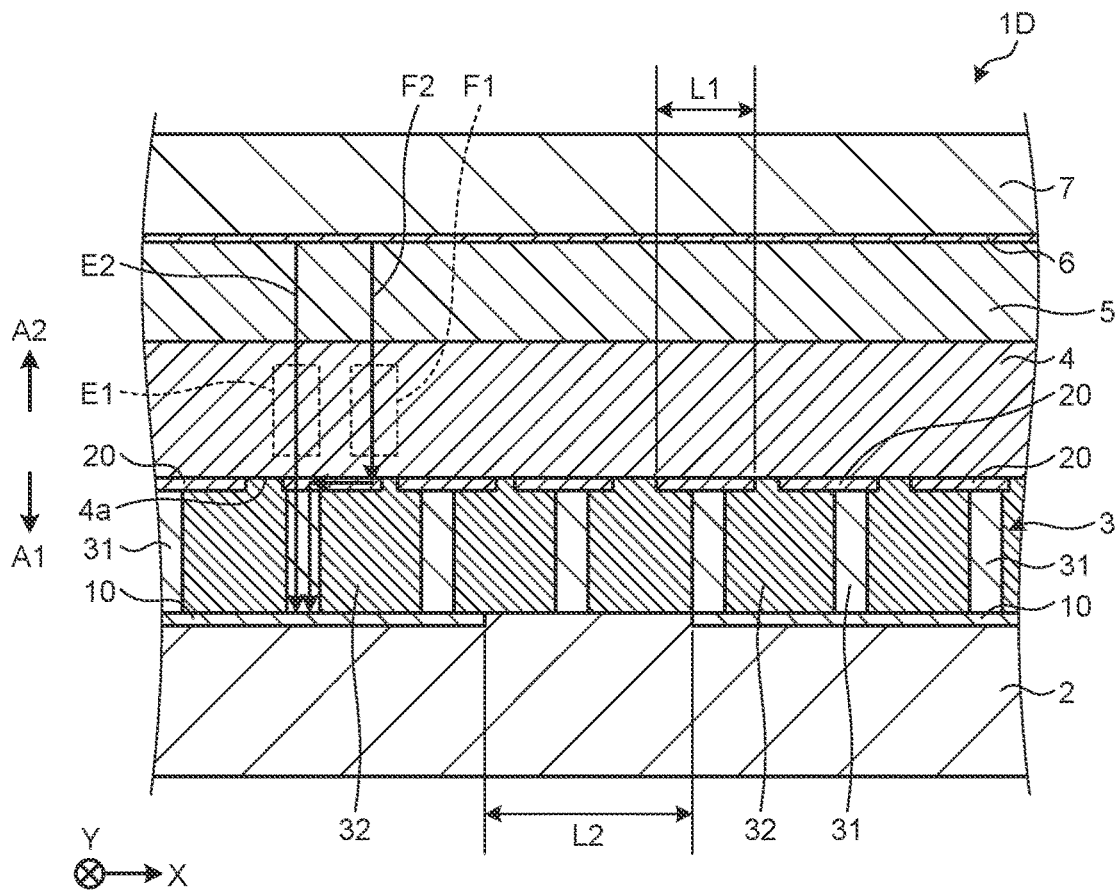
FIG. 11 is a cross-sectional view illustrating a cross-sectional structure of a force sensor according to a fifth embodiment.

FIG. 11 is a cross-sectional view illustrating a cross-sectional structure of a force sensor according to a fifth embodiment. A force sensor 1D in the fifth embodiment differs from the force sensor 1 in the first embodiment in that it includes a plurality of conductive films 20 interposed between the first adhesive layer 3 and the sensor layer 4. Although the first adhesive layer 3 conducts in the stacking direction by the conductive fine particles, conducting portions and insulating portions are abstracted for explanation in the embodiment. In other words, as illustrated in FIG. 11, parts of the first adhesive layer 3 that conduct in the stacking direction by the conductive fine particles are referred to as conducting portions 31 and parts thereof that are formed of the base material and are insulating parts are referred to as insulating portions 32 for explanation.

The conductive films 20 are made of a conductive material as a raw material. The conductive films 20 are patterned on the first surface 4a of the sensor sheet before the sensor sheet is bonded to the first adhesive layer 3. Although not particularly illustrated in the drawing, the conductive films 20 are formed into circular shapes when viewed in the stacking direction. The area of each conductive film 20 when viewed in the stacking direction is larger than the cross-sectional area (size viewed in the stacking direction) when each conducting portion 31 is cut in the planar direction.

The conductive film 20 causes current to flow from the counter electrode 6 to the array electrode 10 (see an arrow E2) when a place of the sensor layer 4 that is located on the second direction A2 side of the conducting portion 31 (range enclosed by dashed line E1 in FIG. 11) is deformed. Current flows from the counter electrode 6 to the array electrode 10 through the conductive film 20 (see an arrow F2) when a place of the sensor layer 4 that is located on the second direction A2 side of the insulating portion 32 (range enclosed by dashed line F1 in FIG. 11) is deformed. As is seen from the above, the conductive films 20 increase the contact area between the conducting portions 31 and the sensor layer 4, thereby increasing an area in which force can be detected.

A diameter L1 of each conductive film 20 is smaller than a distance L2 between the array electrodes 10. This configuration avoids the conductive films 20 from electrically coupling the adjacent array electrodes 10 to each other. Although the conductive films 20 in the embodiment have the circular shapes, they may be rectangular and are not particularly limited. Since the conducting portions 31 are irregularly arranged in the first adhesive layer 3, the conductive films 20 may also be irregularly formed on the sensor sheet (sensor layer 4).

The sensor layer 4 in each of the first embodiment to the fifth embodiment is manufactured using a resistance-change-type pressure-sensitive material whose resistance value changes with force application. The material of the force sensor is not however limited thereto. A sixth embodiment therefore explains a sensor layer manufactured by a different pressure-sensitive material.

Sixth Embodiment

Figure 12:
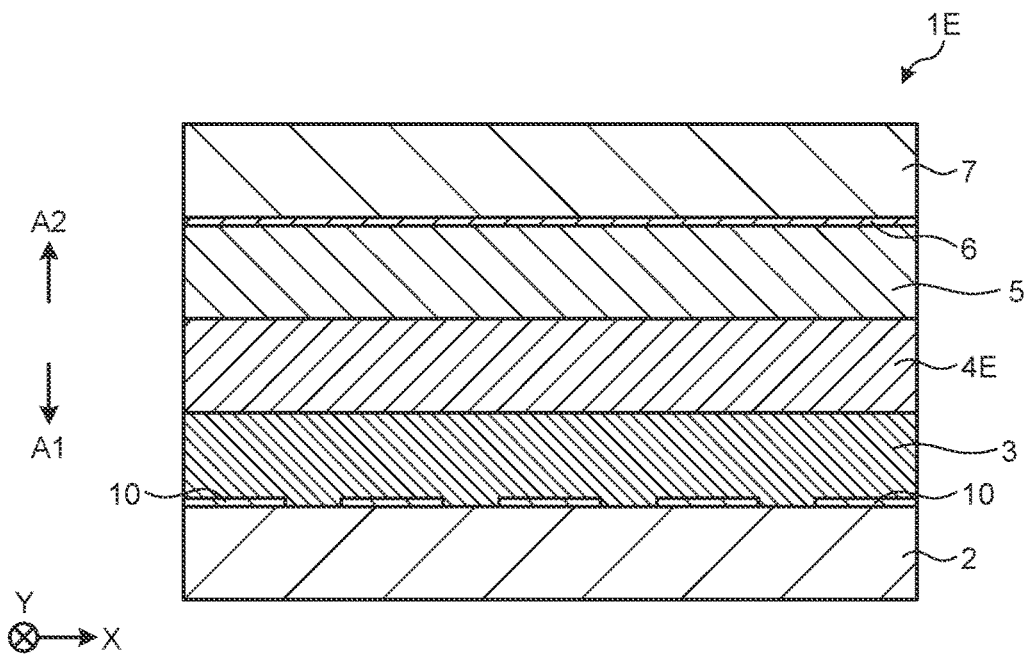
FIG. 12 is a cross-sectional view illustrating a cross-sectional structure of a force sensor according to a sixth embodiment.

FIG. 12 is a cross-sectional view illustrating a cross-sectional structure of a force sensor according to the sixth embodiment. A force sensor 1E in the sixth embodiment differs from the force sensor 1 in the first embodiment in that it includes a sensor layer 4E instead of the sensor layer 4. In the sixth embodiment, a piezoelectric or capacitive pressure-sensitive material is used as an example as the pressure-sensitive material forming the sensor layer 4E. Specifically, examples of the piezoelectric pressure-sensitive material include polyvinylidene fluoride (PVDF) and lead zirconate titanate (PZT). With this material, when the sensor layer 4E changes due to force application, voltage generated between the counter electrode 6 and the array electrode 10 increases, thereby detecting that force is applied to the protective layer 7. Examples of the capacitive pressure-sensitive material include rubber or polymer compound that is elastically deformable and has insulation properties. With this material, when the film thickness of the sensor layer 4E changes due to force application, electric charges that are accumulated between the counter electrode 6 and the array electrode 10 changes, thereby detecting that force is applied to the protective layer 7.

What is claimed is:

1. A force sensor comprising:
a sensor sheet having a first surface and a second surface on an opposite side to the first surface;
a substrate facing the first surface;
a first adhesive layer interposed between the substrate and the sensor sheet and made of an anisotropic conductive material; and
a plurality of array electrodes that are separated from each other and interposed between the substrate and the first adhesive layer, wherein
the first surface of the sensor sheet is bonded to the first adhesive layer, and
the first adhesive layer has conductivity in a thickness direction and has insulation properties in a first planar direction along a first plane,
the first adhesive layer has a conducting portion that conducts in the thickness direction and an insulating portion that insulates in the thickness direction,
a plurality of conductive films are interposed between the first adhesive layer and the sensor sheet and are disposed on a surface of the sensor sheet and laterally along the surface of the sensor sheet,
a planar area of each of the conductive films is larger than that of the conducting portion,
an extending direction of the planar area intersects the thickness direction, and
the conductive films increase a part of the sensor sheet that conducts with the conducting portion.

2. The force sensor according to claim 1, comprising:
a protective layer facing the second surface;
a second adhesive layer interposed between the sensor sheet and the protective layer; and
a counter electrode interposed between the protective layer and the second adhesive layer, wherein
the second surface of the sensor sheet is bonded to the second adhesive layer.

3. The force sensor according to claim 2, wherein
a plurality of the counter electrodes are provided,
the counter electrodes are separated from each other, and
the second adhesive layer has conductivity in a thickness direction and has insulation properties in a second planar direction along a second plane.

4. The force sensor according to claim 1, comprising:
a protective layer facing the second surface, and
a counter electrode that is interposed between the sensor sheet and the protective layer and is in contact with the second surface of the sensor sheet.

5. The force sensor according to claim 1, wherein a counter electrode is provided on the substrate at a position that does not overlap with the array electrode.

* * * * *